June 26, 1956  O. F. WYSS  2,751,947
METHODS FOR PRODUCING WOOD PARTICLES FOR THE MANUFACTURE
OF FIBER BOARDS AND THE LIKE MATERIALS
Original Filed Aug. 16, 1948  6 Sheets-Sheet 1

Inventor:
Oswald Fidel Wyss
By C. M. Avery
Attorney

June 26, 1956 O. F. WYSS 2,751,947
METHODS FOR PRODUCING WOOD PARTICLES FOR THE MANUFACTURE
OF FIBER BOARDS AND THE LIKE MATERIALS
Original Filed Aug. 16, 1948 6 Sheets-Sheet 2

Inventor:
Oswald Fidel Wyss
By
C. M. Avery
Attorney

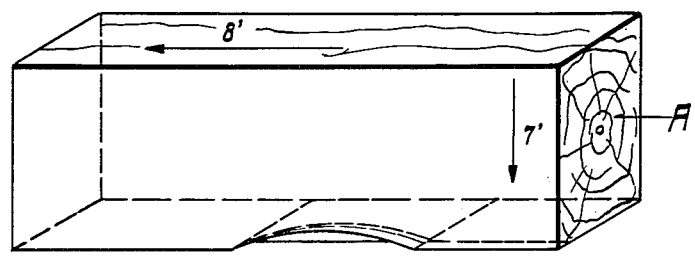
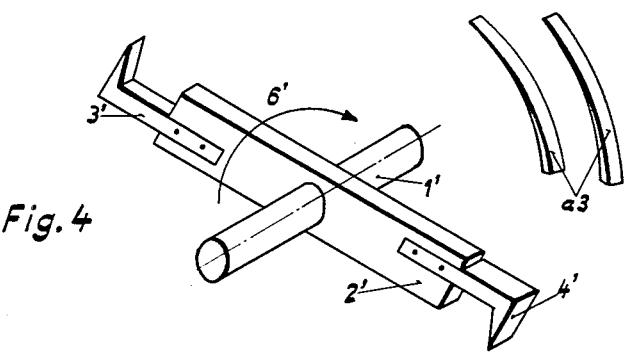
Fig. 4
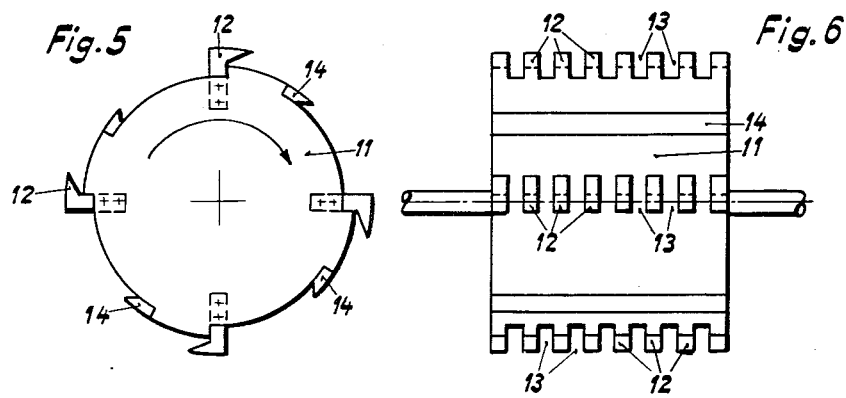
Fig. 5
Fig. 6

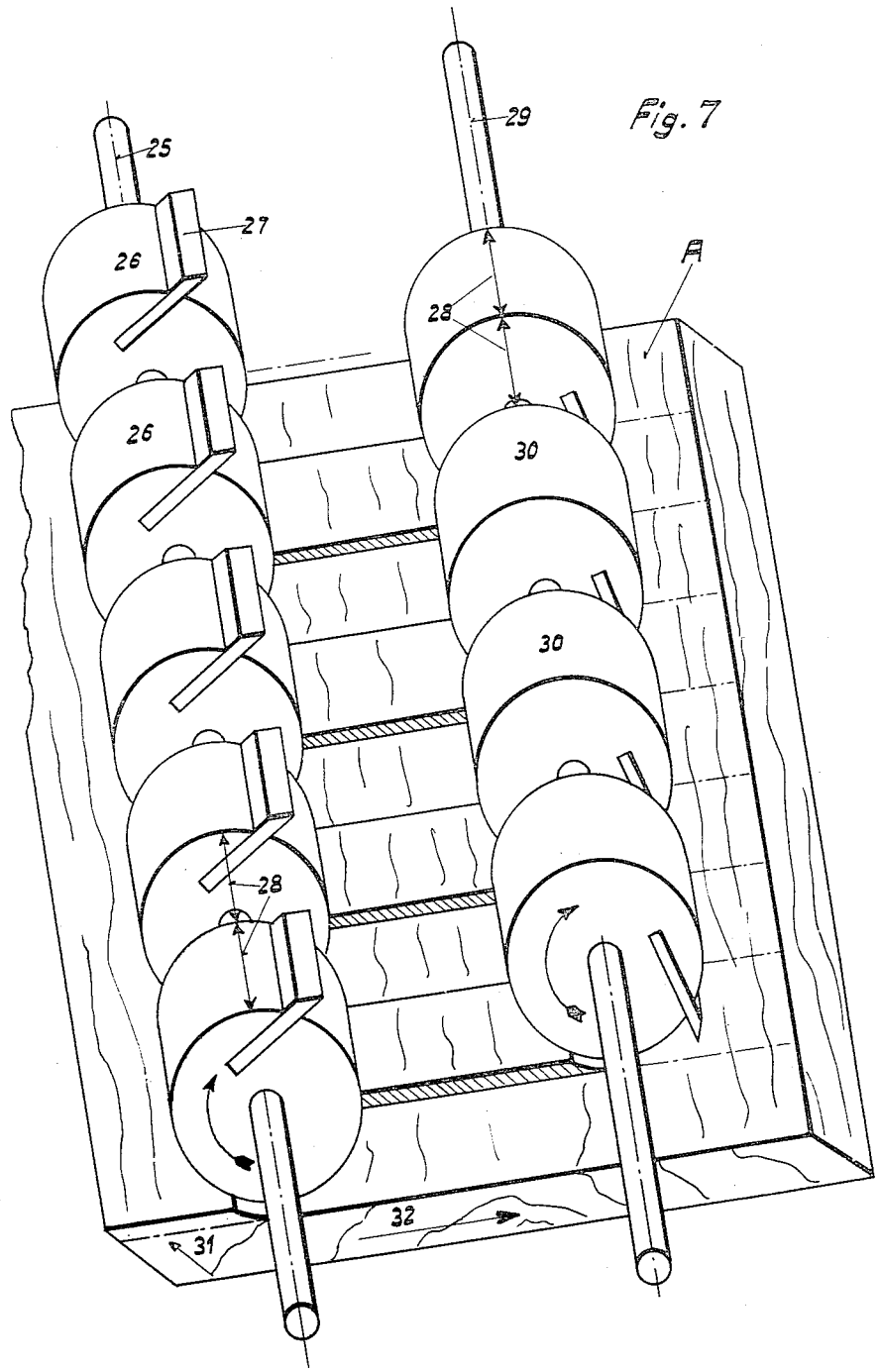

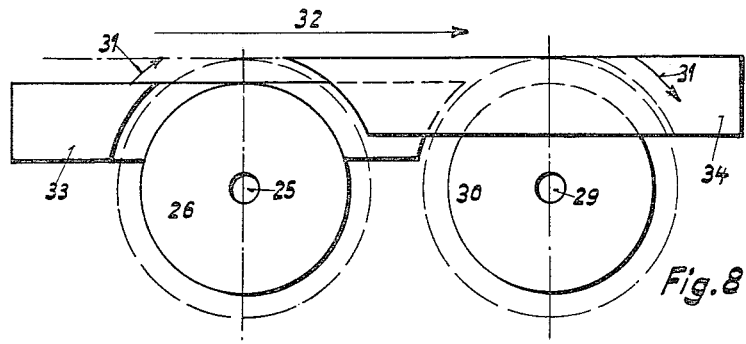
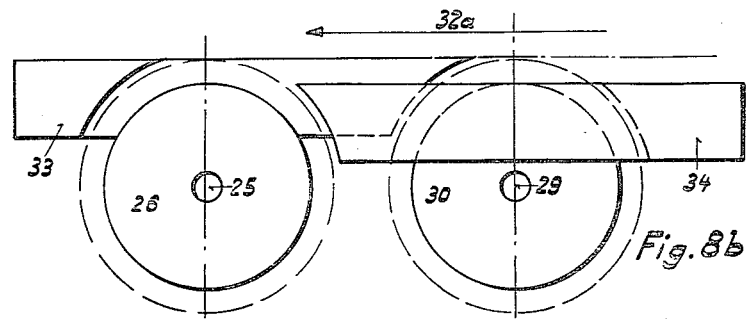
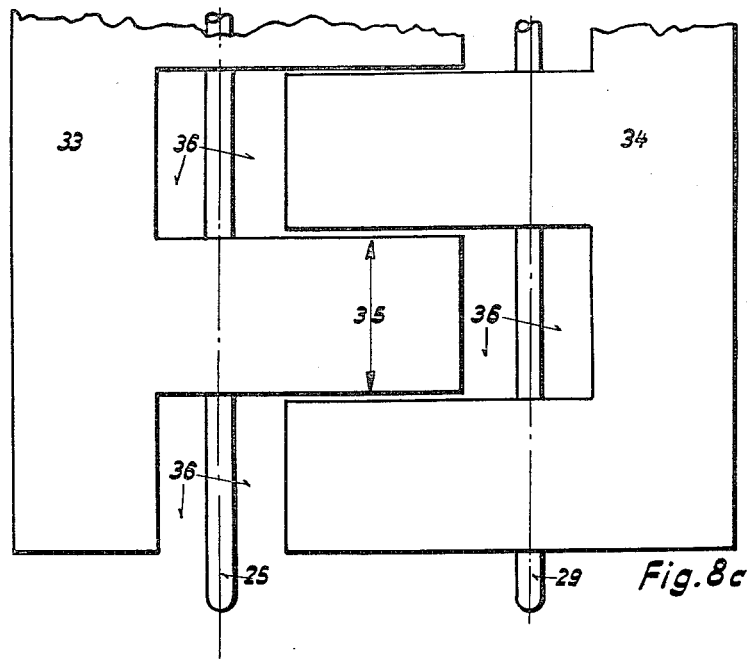

June 26, 1956   O. F. WYSS   2,751,947
METHODS FOR PRODUCING WOOD PARTICLES FOR THE MANUFACTURE
OF FIBER BOARDS AND THE LIKE MATERIALS
Original Filed Aug. 16, 1948   6 Sheets-Sheet 6
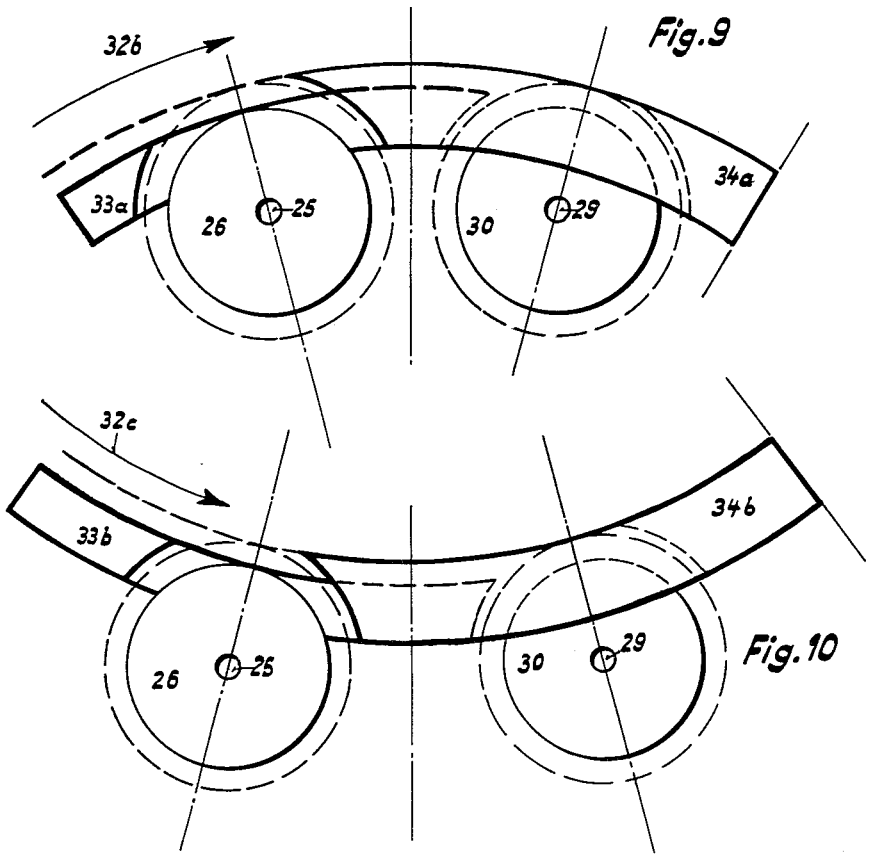
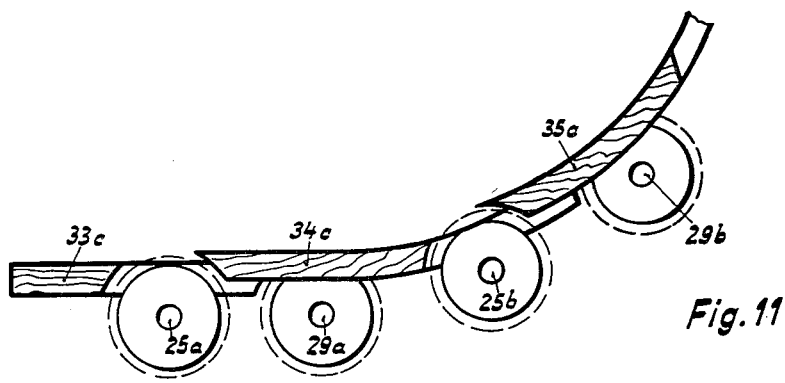
Inventor:
Oswald Fridel Wyss
By C. M. Avery
Attorney United States Patent Office 2,751,947
Patented June 26, 1956

2,751,947
METHODS FOR PRODUCING WOOD PARTICLES FOR THE MANUFACTURE OF FIBER BOARDS AND THE LIKE MATERIALS

Oswald Fidel Wyss, Flims-Waldhaus, Graubuenden, Switzerland, assignor to Allwood Incorporated, Glarus, Switzerland, a corporation of Switzerland Original application August 16, 1948, Serial No. 44,546. Divided and this application March 18, 1952, Serial No. 277,107

Claims priority, application Switzerland April 12, 1946

2 Claims. (Cl. 144—309)

My invention relates to methods and means for producing wood particles for the manufacture of fiber boards or the like wood composition materials, and is disclosed and claimed hereinafter as a division from my copending (now abandoned) patent application Serial No. 44,546 which was filed August 16, 1948, as a continuation-in-part of my earlier applications (now abandoned) Serial No. 742,152 and Serial No. 742,153 both filed April 17, 1947.

The manufacture of wood fiber materials from wood shavings and binding agents is known as such. As a rule, waste products of wood working industries have been used for this purpose. However, it has also been proposed to use coarser pieces of waste wood and to reduce them to the size of shavings before mixing them with the binding agent. It is also known to manufacture wood fiber materials from wood wool. The binding agents used or proposed for manufacturing fiber materials from the various wood products according to the so-called "dry methods," include artificial and natural resins, albumen glues such as casein glue, also fish and bone glues and the like, and mineral binders such as cements, gypsum or water glass.

Wood fiber materials have also been manufactured according to the so-called "wet methods." According to this method a watery suspension of fine-grained, feltable fibers, if necessary with additional binding agents, is used for producing preshaped bodies which are solidified and fabricated to obtain the final material.

The above-mentioned dry methods are easier to apply but have the disadvantage of resulting in products of inferior quality. On the other hand, the wet methods, at least in their latest form and under special conditions, produce materials of superior qualities but have the considerable disadvantage of requiring a large quantity of water which must be kept in circulating motion during part of the process and must eventually be removed as waste water. The preshaped wet bodies resulting as an intermediate product of the wet methods also require, for drying, a considerable expenditure in calories.

The low qualities of fiber materials resulting from the known dry methods can be traced mainly to the fact that the mass of wood shavings or the like wood particles have a loose texture rather than the interlinked or interwoven and more uniformly dense texture required for obtaining higher quality values, for instance, as regards strength, hardness, uniformity, stability, and water repellence of the product. Besides, the above-mentioned wood particles are often bent or broken and their orientation within the composition product is accidental and irregular. As a result, the individual strength of the particles is not used to optimum advantage and the binding surfaces between the particles are unfavorable, thus affecting the qualities of the composite fiber material.

Among the various wood particles conventionally used for dry methods, wood wool represents, to some extent, a noticeable exception. Since this starting material is filament shaped and intertwined, the final product has a corresponding coherent texture. However, there are concomitant disadvantages. Wood wool is not pourable but has the tendency to bunch or lump so that it is extremely difficult to fully mix or impregnate it with the binding agent. The mixture of wood wool and binding agent cannot readily be shaped, and it is virtually infeasible to obtain a uniform thickness and a uniform and predetermined mixing proportion. In addition to these disadvantages, there is also the drawback that for producing wood wool, lumber of relative high quality must be used rather than surface wood, knotty wood, and other wood waste.

It is an object of my invention to provide a wood particle material that, while suitable for the manufacture of wood composition products by the dry method, fully avoids the above-mentioned disadvantages. More specifically, the invention aims at providing a pourable wood-particle material which, even if made of low-quality wood waste, will result in dry-processed composition products whose qualities are well comparable with, or in some respects even superior to, products made by the wet method. It is also an object of my invention, akin to those already mentioned, to make a dry-method wood-fiber material whose individual particles have optimum strength, favorable binding surfaces and the tendency to interweave.

To achieve these objects, and in accordance with my invention, the wood particles, to be used for the dry production of composition boards or the like articles, are produced by reducing pieces of wood with the aid of cutting tools into elongated shavings of a predetermined flat shape and sufficient shortness to be pourable, and by feeding the wood pieces relative to the cutting tools so that the longitudinal axis of the shavings extends substantially in the direction of the natural growth of the wood.

Such shavings can be cut from pieces of wood of any kind, waste wood being preferable because the invention permits taking advantage of this cheap and otherwise little usable material without detriment to the desired qualities of the shavings. The shavings, by virtue of their good pourability, can be readily and perfectly mixed and molded together with the binding agent. They permit obtaining fiber boards and other end products of uniform density, thickness and shape. Due to the particular strength of the individual shavings, their capability of forming an interwoven structure and their good and ample binding surfaces, the boards or other materials made from such shavings have excellent qualities. These qualities can be predetermined and can be made especially pronounced in one or the other respect, depending upon the intended application, by correspondingly selecting the particular shape or configuration of the shavings and by selecting and proportioning the binding agent.

Depending upon the particular cutting method used, the longitudinally fibered shavings made according to the invention may have different shapes: (1) They may be leaf or band shaped, i. e. essentially two-dimensional, and neither bent nor broken. (2) They may have the shape of a slightly curved band which is tapered over its entire length. (3) The shavings may be cut on a bias at an acute angle so as to have the tendency to break longitudinally. Two or more of these different kinds of shavings may be mixed together for producing the composition article, or may be used in different portions of the article to achieve special effects.

According to one of the more specific features of the invention, the shavings are sliced from the piece along the direction of natural growth by means of rotating tools which attack the wood in the plane of rotation or tangentially thereto while either the tools or the wood piece is fed in a direction perpendicular or tangential to that plane. This results in longitudinally fibered shavings of the above-mentioned kind which are leaf or band shaped, i. e. essentially two dimensional, and which preserve their original structure, i. e. are neither bent nor broken. A similar method of cutting results in strip-shaped and slightly curved shavings that are tapered over their entire length like a wedge.

The reduction of the wood, for the purposes of the invention, may also be effected by cutting the shavings from the longitudinal side of the wood piece and perpendicular to its direction of growth by means of rotating tools which attack the piece tangentially to the circle of tool rotation while either the wood piece or the tools are being moved in a direction parallel to the plane of that circle. This results in longitudinally fibered shavings of an approximately rectangular strip shape of essentially two-dimensional extent. Such shavings preserve the original texture in the direction of growth and have the tendency to splinter longitudinally. This cutting method can be carried out in such a manner that the cells of the shavings are cut on a bias so that the just-mentioned tendency of longitudinal splitting is increased.

While it will be understood from the foregoing that various methods and means are available for producing intentionally shaped wood shavings in accordance with the invention, the devices described presently have been found to be especially advantageous.

One embodiment of the disintegrating device according to the invention, suitable for producing shavings of the first above-mentioned kind of shavings, has rotating slicing tools whose cutting edges have a setting corresponding to the desired width of the shavings and extend in the plane of tool rotation. This device has means for feeding the tools or the wood piece in parallel to the axis of rotation and preferably in increments corresponding to the thickness of the shavings.

For producing the second-mentioned kind of shavings, a device is preferably used which has rotating cutting tools whose cutting edges have a length corresponding to the width of the shavings. The cutting edges act tangentially to the circle of tool rotation and extend parallel to the axis of rotation. The feeding means of the device move the tools or the wood piece perpendicularly to the axis of rotation, preferably in steps corresponding to the thickness of the shavings.

For producing shavings of the third-mentioned kind, a device with rotating milling tools is favorably employed, the cutting edges being as long as the shavings to be produced. These edges extend tangentially to the plane and parallel to the axis of tool rotation. The wood piece or tools are fed towrad each other, preferably in increments corresponding to the thickness of the shavings, in a direction perpendicular to the axis of rotation.

The above-mentioned and more specific objects and features of the invention will be apparent from the following description in conjunction with the drawings, in which:

Fig. 4 shows, in perspective and schematically, another embodiment of a wood disintegrating device according to the invention, while Figs. 5 and 6 shows a front and side elevation of a modified tool applicable for producing shavings of a shape similar to those obtained with a device according to Fig. 4;

Fig. 7 is a perspective illustration of a further embodiment of a disintegrating device with a plurality of cutters similar to those of a milling machine, and Figs. 8a, 8b, and 8c represent a supporting and feeding structure for devices of the type shown in Fig. 7; and Figs. 9, 10 and 11 show guide and feed structures of curved design also applicable for devices of the type exemplified by Fig. 7.

Figure 1:
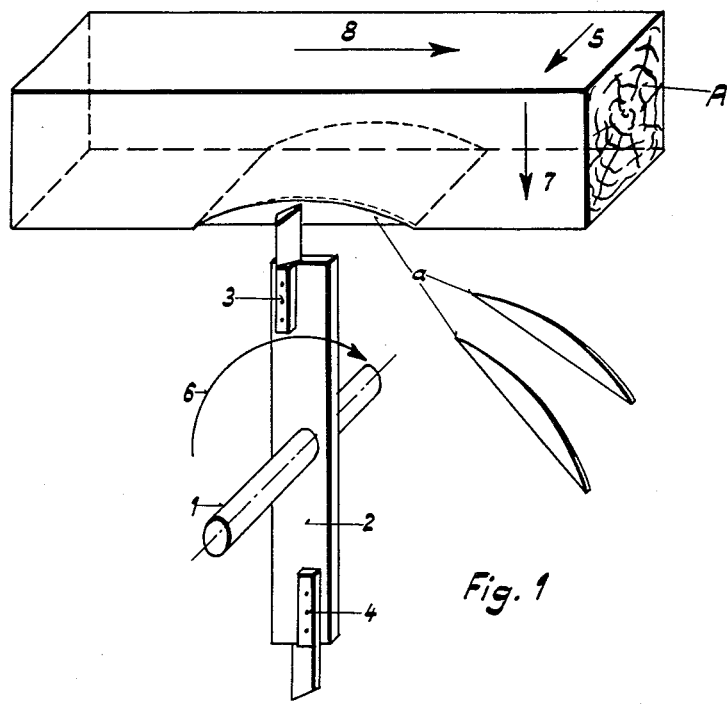
Figs. 1 and 2 show schematically a perspective view and a sectional view, respectively, of a device with rotating peeling knives for producing wood shavings in accordance with the invention.
Figure 2:
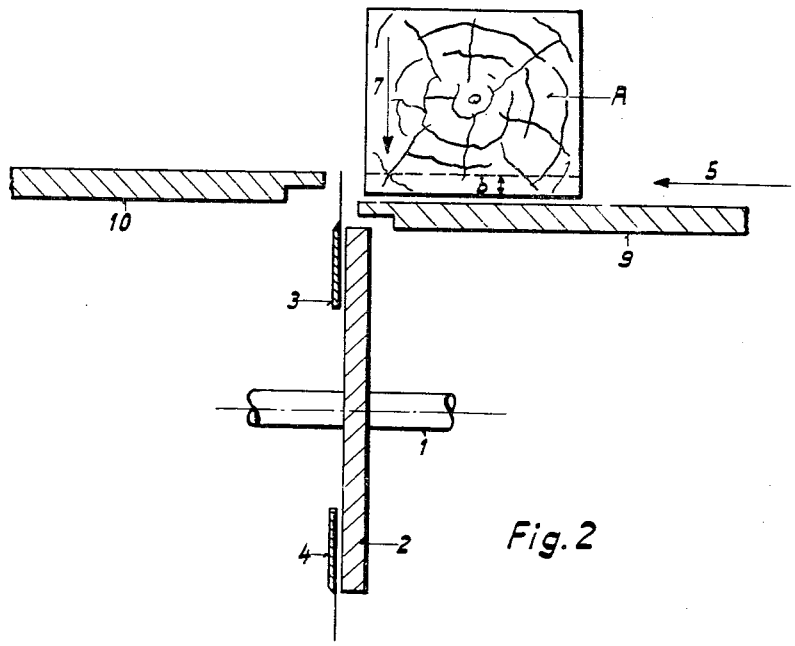

Figs. 1 and 2 illustrate the production of shavings of the kind according to the invention by means of rotating slicer knives whose cutting edge extends in parallel to the plane of rotation. According to Fig. 1, a shaft 1 carries a tool composed of a tool carrier 2 and slicing knives 3 and 4. The knives rotate in the direction of the arrow 6. Each knife has a wedge-shaped cross section which widens from the cutting edge toward the back of the knife as shown in Fig. 1 (only the cutting edges are schematically shown in Fig. 2). When slicing through the wood piece A, the wedge action of the knife separates an individual shaving from the piece. The tool carrier may carry more than the two illustrated knives. The wood piece A is so arranged that its direction of longitudinal growth extends tangentially to the tool rotation. Consequently, the elongated shavings $a$ sliced from the piece extend in the direction of growth. The height of the shavings corresponds to the incremental feed of the wood piece in the direction of the arrow 7. The length of the shavings is determined by the just-mentioned amount of feed as well as by the diameter of the knife orbit. The thickness of the shavings depends upon the ratio of the (slow) feed movement in the direction of the arrow 5 to the (high) speed of tool revolution. During each cutting pass of an individual knife, one flat shaving is sliced off the piece A whose thickness is only a small fraction of the width of piece A in the direction of the arrow 5. Consequently, many successive cuts are necessary to reduce the entire width of the piece into flat shavings.

Figure 3A:
Figs. 3a and 3b show different shapes of individual shavings made by such a device.
Figure 3B:
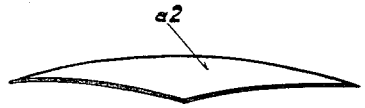

After the tool has passed along the work piece in opposition to the direction of arrow 5 (or after one complete feed movement of piece A in the direction of arrow 5), a non-illustrated second tool similar to the one shown is effective to slice another batch of shavings. The second tool comprises another carrier 2 with knives 3, 4 mounted on a shaft 1 that extends parallel to the illustrated shaft and is displaced relative thereto in the direction of arrow 8 or against that direction by an amount equal to or less than, the length of the shavings. Thereafter, a third tool, correspondingly displaced, starts cutting, and so forth until one layer of the work piece along its direction of growth is removed. After such a complete passage, the work piece is fed in the direction of the arrow 7 and the next passage is started either in the same or the reverse direction. The number of slicing tools or tool carriers depends upon the length of the work piece A and the amount of tool displacement. These tools or tool carriers may be arranged so that each is ahead or behind an adjacent one in the direction of the arrow 5 and is also laterally displaced in the direction of the arrow 8 or in opposition thereto so that the points of attack of all tools lie in a common plane (horizontal in Figs. 1 and 2), the work piece A being reciprocated along this plane in the direction of the arrow 5 and in opposition thereto. With such an arrangement, and assuming that all tools have equal amounts of mutual displacement, the shavings obtained during the first complete relative passage of work piece and tools represent segments of the tip circle of tool rotation such as the shavings $a$ shown in Fig. 1 which are cut from the first layer $b$ (Fig. 2) of the work piece. The shavings produced during the subsequent passages, however, have a shape similar to those shown in Figs. 3a and 3b.

Devices of the type described may be considered to comprise two rigid machine portions or systems that are displaceable relative to each other in the sense or counter sense of the arrow 5. One of these systems includes the workpiece and the feed and guide means therefor, while the other system is composed of the tools, the drive means for the tools, the devices for carrying off the shavings, the structural elements for taking up the pressure exerted on the work piece in the direction of the arrow 7, and possibly also the means for controlling the feed and reversing movements.

The feed and reversing movements are best apparent from Fig. 2. In this figure, the wood piece A is shown by a frontal view relative to its direction of longitudinal growth. The piece is fed toward the tool in the direction of the arrow 5. The pressure exerted on the piece A in the direction of the arrow 7 is taken up by a supporting member 9, such as a ledge or rail, whose top surface is lower than the knife orbit by the height b of the shavings. After the piece A has passed by the knife orbit of the tool, the groove cut into the piece passes over a supporting member 10 which is also designed as a ledge or rail and positioned so that its top surface, if extended, would coincide with the peripheral orbit of the peeling knives. One pair of supporting members, such as rails 9 and 10, is also associated with each of the other (non-illustrated) slicing tools or tool carriers. Before starting the reverse feed movement (against the direction of arrow 5), the member 10 is moved up in an amount equal to b, and member 9 is moved down the same amount b.

Figure 3:
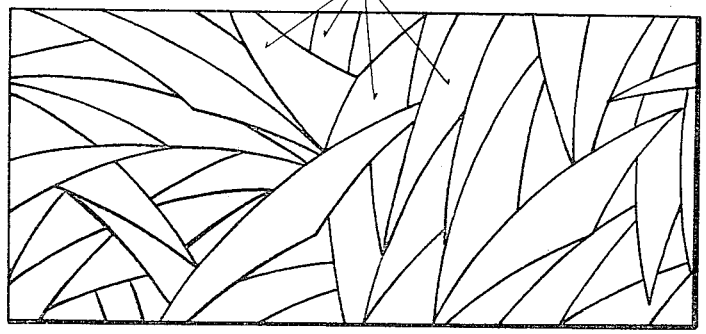
Fig. 3 represents diagrammatically the type of texture of a fiber board or other bodily material obtainable with shavings produced by the device of Figs. 1 and 2.

The shape of the shavings depends not only, as mentioned, upon the dimensions of the tip circle or knife orbit and the degree of feed, but is also determined by the degree of lateral setting of the slicing knives in the direction of the arrow 8 (Fig. 1). As desired, leaf-shaped, flaky, lancet-shaped or ribbon-shaped shavings can be obtained which, in the finished product, have a scale-like orientation or an interplaited and interwoven, or a piled and crossed arrangement. The longitudinal direction of all shavings extends in the main direction of growth, hence, in the main direction of strength. Due to their thinness, the flat shavings arrange themselves in the body to be produced to a dense texture, free of bridge and gap formation, in which the individual shavings are closely joined together in a snug face-to-face relation. These shavings are substantially similar to one another. As a matter of fact, if the wood disintegrating device is accordingly adjusted, the shavings may have a high accuracy and uniformity of dimensions and shape. Under such conditions, the total surface area of the shavings per unit of volume and, therefore, the proportion of binding agent required for optimum efficacy can be accurately determined. Fig. 3 shows a typical surface texture of a material made of such shavings, in particular, those shown at a2 in Fig. 3b.

Figs. 4 to 6 serve to elucidate the production of shavings according to the invention by means of chisel-type tools with cutting edges perpendicular to the plane of tool rotation.

According to Fig. 4, a shaft 1' carries a tool carrier 2' with two tool bits 3' and 4' which differ from the knives of Fig. 1 by having their cutting edges extend transverse to the tool orbit, thus acting mainly in a chiselling rather than a slicing manner on the wood piece A. The length of each cutting edge is only a fraction of the width of piece A in the axial direction of the tool carrier. Hence, many individual cuts are necessary, side by side, to reduce the wood piece to shavings over the entire width of the piece. As regards its direction of growth, the piece A is arranged and fed as explained with reference to Fig. 1. The directions of feed are indicated by arrows 7' and 8'. As a rule, the main feed movement, according to arrow 8', is in opposition to the direction of tool travel (arrow 6'). The height of the shavings a3 is determined by the ratio of the (slow) horizontal feed movement to the (high) speed of revolution of the tool and to the number of appertaining tool bits. The wedge-shaped shavings are tapered over their entire length and slightly curved, as shown at a3 in Fig. 4.

In order to increase the efficiency of tools for devices according to Fig. 4, a multiple tool design is preferably chosen such as exemplified by Figs. 5 and 6. Such tools have a drum-shaped carrier 11 equipped with a number of axially and radially spaced tool bits 12, the axial spacing 13 being normally equal to the length of the cutting edges. Cutting rulers 14 are disposed on the drum surface behind each set of tool bits.

In devices according to Figs. 4 to 6, the shape of the shavings, as regards length and thickness can be controlled, for any given tool periphery, by changing the degree of feed. The larger the tool periphery, the longer and flatter are the shavings and the better is their longitudinal direction coincident with the direction of growth.

Figs. 7 to 11 serve to elucidate the production of shavings by milling the work piece along its direction of growth, and also illustrate schematically some milling devices of high efficiency suitable for this type of production.

According to Fig. 7, a tool shaft 25 is equipped with a number of customary cutters 26 with respective bits 27. The cutters are spaced from one another a distance equal to their width, i. e. equal to the length of the cutting edges, as is indicated by double-headed arrows 28'. Another tool shaft 29 extends in parallel to shaft 25 and behind shaft 25 relative to the milling direction. Shaft 29 carries a number of cutters 30 which correspond to the cutters 26 but are arranged to cover the gaps between the cutters 26. The width of all cutters is the same, although the cutters on shaft 29 may be 1 to 2 mm. wider, or the interstices between the cutters 26 may be a few millimeters narrower, than the cutters 26. The overall width of all cutters on both shafts corresponds to the length of the work piece A in its direction of longitudinal growth. This direction extends in parallel to the shafts. The arrow 31 indicates the direction of the incremental feed effective after each complete passage, and the arrow 32 the direction of the continuous feed movement during each passage. The direction of rotation of the cutters at the points of attack may be in the direction of the continuous feed (arrow 32) or in opposition thereto, depending upon the arrangement of the cutter bits. As the work piece passes along the cutters, the ledges of material remaining between the cutters of shaft 25 are shaved off by the cutters of shaft 29. The length of the individual shavings or milling chips, measured in the direction of growth, corresponds to the length of the cutting edges.

Devices of the type just described offer the advantage of being composed of customary milling tools, i. e. of simple and sturdy tool units that are readily removable for exchange or re-sharpening. Such devices combine excellent efficiency with a minimum of space requirements and are well suited for the mass production of uniform particles of the shape and quality desired for the purposes of the invention.

Figs. 8a, 8b, and 8c represent an arrangement of the guiding tables which, in a device according to Fig. 7, permit feeding the wood piece in alternate directions, i. e. alternately in the directions of arrows 32 and 32a, against the cutters. Fig. 8a and Fig. 8b show front views in respectively different positions of the guiding tables, while Fig. 8c is a part-sectional top view of the tables and the two tool shafts 25 and 29. As apparent from Figs. 7, 8a, and 8b, the shafts are equipped with cutters 26 and 30, respectively, although these cutters are omitted in Fig. 8c. In Figs. 8a and 8b, the cutter peripheries are shown by dotted lines. The two guiding tables 33 and 34 straddle each other with tooth-like projections whose width 35 correspond to that of the cutters. The teeth of the respective table leave gaps 36, and the cutter edges attack the work piece while passing through these gaps. The two tables are upwardly and downwardly movable in the sense of the arrow 31. According to Fig. 8a, the top surface of the upper table 34 is tangential to the tip circle of the milling cutter 26. When a piece of wood is placed upon the top of the lower table 33 and is moved against the milling cutter 26 in the direction of the arrow 32, the cutter 26 will mill off a layer of material whose height is equal to the distance in vertical spacing between the top surfaces of tables 33 and 34. This layer of wood will be reduced to shavings, and the thickness of the shavings will be equal to the layer thickness, i. e. equal to the vertical spacing between the tops of tables 33 and 34. After the piece of wood has completely passed onto the top of the table 34, this table is lowered and the table 33 is lifted. The tables now occupy the relative positions illustrated in Fig. 8b. When now the piece of wood is traversed against the milling cutter 30, another layer is milled off into shavings, and the resulting shavings now have a thickness equal to the vertical spacing between the two table tops. This spacing is adjusted to the desired thickness of the chips or shavings. Due to the meshing engagement of the tables, the work piece is securely guided during its entire passage, in front of and behind the tools.

Guiding tables of the type just described may be designed as individual units which may be combined with one another in any desired number of repetitive series of units. Such an arrangement of table units can readily be designed to provide any desired gradual deflection of the guide path. For instance, the feed and guiding path may include curved table units as shown at 33a and 34a in Fig. 9, or at 33b and 34b in Fig. 10. An arrow 32b in Fig. 9 and 32a in Fig. 10 denotes the direction of continuous feed during the passage for which the illustrated table units are adjusted. The tool shafts in both figures are denoted by 25 and 29, and the respective cutters by 26 and 30. As will be recognized from Figs. 9 and 10, cylindrically operating devices are obtained if the guide structure is built up only of table units according to either figure. However, straight and differently curved units can also be joined with one another in order to compose a guide path of any desired other configuration. This is exemplified by Fig. 11, showing straight and curved table units 33c, 34c, and 35c arranged as a guide for a series of tools on consecutive shafts 25a, 29a, 25b, 29b. Such devices, regardless of their particular design, are to be equipped with the necessary accessories, for instance, drive and control means for moving the work piece, changing the table adjustment, and conveying the shavings.

As mentioned, the shavings produced by the above-described methods and devices according to the invention are to be mixed with binding agent and molded to the shape of the fiber board or other body to be produced. In this respect, the manufacturing methods and means are generally similar to those of the known "dry methods," except that the invention results in products of highly improved quality. As a rule, the various known binding agents are readily applicable with wood shavings made according to the invention. Preferable, are binding agents and binding methods that produce or favor a tight welding together of these flowable and mutually interweaving particles. As a rule, artificial resins are preferable, although natural resins, glues and mineral binding agents may also produce satisfactory results for some applications. A favorable binding effect is achieved, for instance, by using binding agents derived from wood. Such ligneous binding agents are added to the shavings either in the form of ligneous resins or in the form of slimy, mucilagious or cement-like ligneous products.

In fiber boards or other composition products made of wood shavings that are produced in accordance with the invention, the texture of the shavings themselves is the main basis for the desired physical properties, such as strength and uniformity. By virtue of this fact, appreciable amounts of binding agent can be saved as compared with known products. This is especially significant with expensive high-quality binding agents and, if desired, permits also to preserve or exhibit the wood-like character in the finished product. Due to the uniformity of the shavings, the proportion of shavings and binding agent and hence the volumetric weight is homogeneous throughout the finished product, and the physical data of the product differ very little at different spots. Also due to the uniformity of the shavings, the ratio of their mass to their total surface can readily be determined for any quantity or batch of shavings. Since the amount of binding agent, for any given agent, depends mainly upon the total surface of the shavings, it is thus possible to accurately determine the needed quantity of binding agent; and the shape of the shavings can be chosen or controlled to provide shavings of minimum total surface so as to obtain optimum results with a minimum quantity of binding agent.

I claim:

1. The method of producing a mass of wood particles for use in wood composition products, which comprises shaving pieces of wood material into pourable elongated shavings all of substantially the same predetermined length and flat shape, applying each individual cut over only a fraction of the total width of the individual pieces of material to be reduced, said fraction being equal to one of the desired dimensions of the shavings to be produced, placing a number of such individual cuts side by side along said total width, orienting the material relative to the cuts with the length of the shavings substantially coincident with the direction of natural fiber growth, and repeating the shaving operation until substantially complete reduction of the material into a mass of such pourable shavings.

2. The method of producing a mass of wood particles for the manufacture of wood composition products, which comprises slicing pieces of wood material along a circular path into pourable shavings of flat and elongated shape, applying each slicing cut over only a fraction of the total width of the individual pieces of material and in a direction of attack substantially in the slicing plane, said fraction being equal to the thickness of the shavings to be produced, placing a number of such cuts side by side along said total width, directing the material relative to the cuts so that the grain direction of the wood substantially coincides with the slicing direction, feeding the material in a direction perpendicular to the slicing plane, and repeating the slicing operation until substantially complete reduction of the material into a mass of such pourable shavings.

References Cited in the file of this patent

UNITED STATES PATENTS

| | | |
|---|---|---|
| 326,983 | Holland | Sept. 29, 1885 |
| 571,019 | Roberts | Nov. 10, 1896 |
| 634,895 | Manning | Oct. 17, 1899 |
| 682,810 | Parks | Sept. 17, 1901 |
| 784,409 | Litz | Mar. 7, 1905 |
| 786,560 | Grimsley | Apr. 4, 1905 |
| 1,046,130 | Widdis | Dec. 3, 1912 |
| 1,431,319 | Merrill | Oct. 10, 1922 |
| 1,615,489 | Straub | Jan. 25, 1927 |
| 1,736,641 | Zimmerman | Nov. 19, 1929 |
| 2,028,080 | Stern | Jan. 14, 1936 |
| 2,294,272 | Boice | Aug. 25, 1942 |
| 2,441,976 | Rooney | May 25, 1948 |
| 2,442,492 | Hassler et al. | June 1, 1948 |